United States Patent [19]
Forss

[11] Patent Number: 4,708,910
[45] Date of Patent: Nov. 24, 1987

[54] FIRE-RESISTANT WOOD COMPOSITES, IN PARTICULAR WALLBOARDS, PROCESS FOR MANUFACTURE OF SAME AND USE OF A BONDING AGENT IN THE MANUFACTURE

[75] Inventor: Bengt Forss, Pargas, Finland
[73] Assignee: Forss Consult Ky, Kb, Finland
[21] Appl. No.: 878,884
[22] PCT Filed: Sep. 20, 1985
[86] PCT No.: PCT/FI85/00078
§ 371 Date: Jun. 30, 1986
§ 102(e) Date: Jun. 30, 1986
[87] PCT Pub. No.: WO86/01766
PCT Pub. Date: Mar. 27, 1986

[30] Foreign Application Priority Data
Sep. 21, 1984 [FI] Finland ............................... 843728

[51] Int. Cl.[4] ..................... B27N 9/00; B32B 21/02
[52] U.S. Cl. ................... 428/453; 156/62.2; 264/123; 428/326; 428/537.1; 428/697; 428/921
[58] Field of Search ............ 156/62.2; 264/123; 428/326, 453, 697, 920, 921, 537.1

[56] References Cited
FOREIGN PATENT DOCUMENTS
1024444 6/1983 U.S.S.R. ............................ 428/326

Primary Examiner—William J. Van Balen
Attorney, Agent, or Firm—Biebel, French & Nauman

[57] ABSTRACT

Fire-resistant wood composites, in particular wallboards, which in addition to a wood component contain a bonding agent consisting of a finely-ground hydraulic blast-furnace slag which is activated by an activator having an alkaline reaction, advantageously by waterglass and alkali hydroxide. The invention also relates to a process for manufacture of such wood composites and to an use of finley-ground hydraulic blast-furnace slag as a bonding agent in the manufacture of such wood composites.

13 Claims, No Drawings

FIRE-RESISTANT WOOD COMPOSITES, IN PARTICULAR WALLBOARDS, PROCESS FOR MANUFACTURE OF SAME AND USE OF A BONDING AGENT IN THE MANUFACTURE

The present invention relates to fire-resistant wood composites, in particular building boards such as wallboards, containing principally a wood component such as wood chips, wood fibres, sawdust and/or woodwool, and a bonding agent, a process for manufacture of said composites and a new hydraulic bonding agent for said manufacture.

The bonding agents currently used for wall boards based on wood fibre, sawdust and woodwool with improved resistance to fire, fungi and termites etc. are principally Portland cement magnesia or Sorel's cement and gypsum. Cement-bonded wood composites such as e.g. particle boards contain 30–70 wt. % wood fibre and particles and approx. 70–30 wt. % of an inorganic bonding agent. The bonding agent affects to a high degree the characteristics of both the process and the product.

Wood fibres which have undergone various preparatory stages are mixed together with a bonding agent, various chemicals and the required quantity of water. After the boards have been formed in one or more layers on a conveyor belt or on plates they normally undergo a preliminary compression in a press after which the boards are compressed at high temperature in a main press. The pressure of the press varies between 5–40 atm. and pressing is continued until the boards have attained sufficient strength for them to be released and transported. The press time for Portland cement bonded boards can amount to 8 h or more, whereas with magnesia cement the release strength can be attained already after 10–15 min.

Pressing is followed by storage, after which the boards are trimmed, sanded and packed.

Particularly for Portland cement bonded boards the long press time and the subsequent long storage involves a high cost and often constitutes the limiting factor in production.

The setting or hardening of Portland cement when it is mixed with the required quantity of water is readily affected by various chemicals. Substances which speed up the setting of the cement are called accelerators and those which delay the hydration reactions are called retarders. Accelerators consist mainly of simple readily-soluble salts of alkali or alkali-earth chlorides, sulphates, nitrates etc. which raise the ion concentrations in the aqueous phase and thereby the solubility for the hydration products of the cement.

Retarders consist of readily soluble metal salts which together with the lime in the cement form sparingly soluble or insoluble Ca salts or reaction products which are precipitated on the surface of the cement grains and hinder further hydration. Soluble organic substances with a high molecular weight also have a retarding effect on the setting of cement.

The most common retarders for Portland cement are carbohydrates and in particular sugar which even in concentrations as low as a few hundredths percent of the weight of cement can cause considerable retardation of the hydration of the cement.

Various species of wood contain many extractable components which have a strongly retarding effect on the setting of Portland cement. The most harmful components are various sugars and starch, tannins, certain phenolic components and decomposition products of hemicellulose. As a consequence in the manufacture of cement-bonded wood composites it is only possible to employ species of wood which have a low content of these components or in which said components can be reduced to an acceptable level without incurring excessive costs.

Hardwoods in particular have a high content of extractable sugar in the form of pentoses and as a consequence it has not normally been possible to employ hardwoods in wood composites containing Portland cement as a bonding agent.

In the hydration of Portland cement large amounts of $Ca(OH)_2$ are released and the pH of the pore solution is around 12.5. At this pH the hemicellulose of the wood is decomposed to smaller units which in part are water-soluble and give rise to retardation of the setting time.

The suitability of wood for purposes such as cement-bonded wood boards can be tested by means of mixing a known quantity of wood chips of known size together with cement and water to form a paste and observing the variation of temperature during hardening in an adiabatic calorimeter. In this way a good idea can be obtained of possible harmful extractable substances in the wood and of the strength and seriousness of any retardation. (W. Sandermann, R. Kohler, "Ueber eine kurze Eignungsprüfung von Hölzern für Zementgebundene Werkstoffe", Holzforschung Bd 18 (1964) H 12 pp. 53–59 and W. Sandermann, U. V. Delm, "Einfluss chemischer Faktoren auf die Festigkeitseigenschaften zementgebundener Holzwolleplatten", Holz als Roh- und Werkstoff 9. H 3 (März) 1951 pp. 97–101.) In this way some hundred different types of wood have been tested for suitability for the manufacture of cement-bonded particle products. Different types of wood give different time-temperature curves and there is a clear relation between the temperature variation in the tests and the development of strength of cement-bonded boards produced from these types of wood.

This testing showed clearly that softwoods in general give less retardation of the setting time than do hardwoods. Suitable types of wood are e.g. spruce, pine and fur, whereas e.g. birch and beech are completely unusable and e.g. oak can be used only subject to certain conditions.

Even softwoods cause a certain retardation of the setting. Accordingly it is stipulated that the wood should be debarked thoroughly and stored under water for several months before use. In this way a certain proportion of the harmful components can be extracted from the wood and the retardation of the setting time reduced. Further, the harmful effect of the wood extract can be counteracted by use of a so-called rapid cement, i.e. a finely-ground cement with a high content of the clinker components $C_3S$ (tricalcium silicate) and $C_3A$ (tricalcium aluminate) which react faster and give a higher evolution of heat than the other clinker components.

The use of various so-called mineralizers with which the wood chips are impregnated before being mixed with cement in order to prevent or reduce extraction of the substances which retard setting has been practiced with success. Among these mineralizers can be mentioned $CaCl_2$, $MgCl_2$, Ca formate and Ca acetate, polyethylene glycol, $MgSiF_6$, nitrites, nitrates, etc. The effect of these mineralizers, however, is limited and moreover their use involves additional measures and increased production costs.

In order to attain higher short-term strengths an addition of $Al_2(SO_4)_3$ and $Ca(OH)_2$ has also been used. These two components give rise to the mineral ettringit $(C_3A.3Ca(SO_4).32-36H_2O)$ which is precipitated as long needle-shaped crystals and thereby contributes to a higher short-term strength.

An object of the present invention is to provide a bonding agent which can replace Portland cement and the even more expensive magnesia cement (Sorel's cement) in the manufacture of fire-resistant wallboards and similar products. It has now been surprisingly discovered in experiments that by means of replacing the Portland cement with finely-ground hydraulic blast-furnace slag and adding suitable chemicals it is possible to overcome many of the difficulties which occur in the manufacture of cement-bonded wood-particle and woodwool boards when Portland cement is used as the bonding agent.

The chief characteristics of the invention will be apparent from the accompanying patent claims.

The use of slag as an admixture in Portland cement usually leads to a cement with low heat evolution, reduced short-term strength and a slower development of strength. The so-called slag cements or mixed cements have accordingly achieved their greatest use in areas in which good short-term strength is not required but in which the emphasis is placed on other properties. It has been established that high-grade cements produce cement-bonded wood-particle products of higher strength by, among others, Czielski in "Beton in Fasern aus Holz", Holz als Roh- und Werkstoff 33 (1975) pp. 303–307 and Pampel and Schwarz in "Technologie und Verfahrungstecknik zementgebundener Spanplatten", Holz als Roh- und Werkstoff 37 (1979) pp. 195–202.

It is thus very surprising that starting with finely-ground hydraulic blast-furnace slag it is possible by the addition or various chemicals to produce a bonding agent which, on the one hand, appears to be insensitive to the normally harmful extract substances in wood and, on the other hand, gives products with short-term strengths which make possible release from the mould after a much shorter time than is possible when using Portland cement as the bonding agent.

At the same time the use of slag permits much higher press temperatures to be employed in the manufacturing process without the final strength being affected adversely as is the case when using e.g. rapid-hardening Portland cement.

The use of blast-furnace slag as bonding agent thus makes it possible to use species of wood which could not otherwise be used in the production of particle boards because of their high content of extractable components with a retarding effect and at the same time expensive lengthy press times can be avoided in the process.

Thus according to the present invention fire-resistant wood composites, in particular wallboards, have been produced, said composites consisting principally of a wood component, such as wood chips, wood fibre, sawdust and/or woodwool, and a bonding agent which consists of finely-ground hydraulic blast-furnace slag which is activated by an activator with an alkaline reaction.

Also according to the present invention a process has been achieved for the manufacture of fire-resistant wood composites, in particular wallboards, by means of bringing a wood component, such as wood chips, wood fibre, sawdust and/or woodwool, into contact with a bonding agent which consists of finely-ground blast-furnace slag and an activator and thereafter forming the mass so obtained into the desired shape, advantageously into boards, under the influence of heat and pressure.

In order that the mass shall have the desired workability the required quantity of water is added.

The proportions of the wood component to the blast-furnace slag are suitably between 20:80 and 80:20 by weight.

If a lighter wood composite is desired, part of the wood component can be replaced by inorganic ballast (material with low density) such as expanded clay, perlite, vermiculite and similar.

Further, part of the blast-furnace slag can be replaced with pozzolanas, e.g. fly-ash and similar.

The activators used for the blast-furnace slag are preferably various alkaline salts and compounds with an alkaline reaction, such as alkali hydroxide. The activator consists advantageously of sodium waterglass and sodium hydroxide in proportions of approx. 0.2–10% sodium waterglass and approx. 1–10% sodium hydroxide calculated on the weight of the blast-furnace slag. Another example of a usable activator is lye, soda and waterglass. The lye used as activator can also be formed in situ, e.g. by means of a reaction between soda and lime.

The invention is described below in greater detail with the help of the following example.

In trials which have been carried out both on a laboratory scale and as a factory trial, the effect of combinations of various alkali salts and NaOH on the setting of the slag was investigated. It was found that the total quantity of alkali salts and also the distribution between the different alkali components both affect the commencement and rapidity of setting and the strength of the products.

In the experiments a hydraulic blast-furnace slag was used which had been ground in a ballmill to a specific surface area of 470 $m^2/kg$. The reaction speed and the development of strength were found by experiment to depend on the specific surface area of the slag. The chemical composition of the slag used was as follows:

CHEMICAL COMPOSITION OF THE SLAG

TABLE 1

$SiO_2 = 36.9$ wt.%
$Al_2O_3 = 9.3$ wt.%
$FeO = 0.5$ wt.%
$CaO = 39.7$ wt.%
$MgO = 9.6$ wt.%
$MnO = 0.7$ wt.%
$K_2O = 0.8$ wt.%

EXAMPLE 1

Various mineral components in the form of bases and alkaline salts have been used as activators. NaOH has long been known as an activator for slag. Together with waterglass it gives rapid setting of a mixture of slag and wood flour in the proportions 90:10, as is apparent from the table below. In the trials the cheaper Na waterglass was usually used, by K waterglass can also be used.

TABLE 2

The setting time of a paste of slag and wood flour (90:10) using various activator compositions. w/c ratio 0.48 (the w/c ratio expresses the ratio by weight of water to bonding agent). Temperature 27° C.

| Trial no. | Wood | Accelerator as % of slag wt. NaOH | Waterglass | Setting time (min.) Start | Finish | Note |
| --- | --- | --- | --- | --- | --- | --- |
| 1 | Spruce | 4 | 7 | 5 | 20 | |
| 2 | " | 4 | 5 | 10 | 35 | |
| 3 | " | 4 | 3 | 50 | 120 | |
| 4 | Birch | 4 | 7 | 5 | 15 | |
| 5 | " | 4 | 5 | 10 | 35 | |
| 6 | " | 4 | 3 | 60 | 140 | |
| 7 | " | 4 | 1 | 110 | 180 | |
| 8 | " | 4 | 1 | 85 | 140 | T = 37° |
| 9 | " | 5 | 1 | 30 | 75 | |
| 10 | " | 5 | 0.2 | 30 | 60 | |

When a similar pastes were prepared with 10% spruce or birch flour and 90% rapid-hardening cement no setting was obtained within 7.5 h from the addition of water. After 24 hours storage the paste had, however, set.

The hardening is strongly dependent on the temperature, the ratio water/bonding agent and the ratio wood/bonding agent.

Some different ways of affecting the setting time of a paste of slag and birch (90:10) are shown in Table 3. Temperature 27° C., water/bonding agent ratio=0.48.

TABLE 3

| Trial no. | Accelerator as % of slag wt. NaOH | Waterglass | Soda | Setting time Start | Finish |
| --- | --- | --- | --- | --- | --- |
| 11 | 3 | 1.0 | — | 4.5 h | 15 h |
| 12 | 4 | 1.0 | — | 2.0 | 3 |
| 13 | 5 | 1.0 | — | 0.5 | 1.5 |
| 14 | 5 | 2.0 | 1.0 | 10 min | 20 min |
| 15 | 5 | 1 | 2.0 | 20 min | 35 min |
| 16 | 4 | 1 (x) | 2.0 | 20 min | 30 min |
| 17 | 4 | 2 (x) | — | 15 min | 25 min |
| 18 | — | — | 8 | 30 min | 90 min |
| 19 | — | 0.5 | 8 | 10 min | 50 min |
| 20 | — | 1.0 | 8 | 5 min | 20 min |
| 21 (xx) | — | 1.0 | 8 | 5 min | 30 min |

(x) metasilicate
(xx) 10% of the slag was replaced with fly-ash

The waterglass can partially or totally be replaced by finely powdered silicic acid.

EXAMPLE 2

It was also found that with the new process it was possible to use in the manufacture of boards types of wood which could not be used when the bonding agent consisted of Portland cement.

From the reports cited earlier it is apparent that e.g. hardwoods could not be used because of their high content of pentoses and other extractable substances which have a strong retarding effect on the setting of the cement.

When slag is used as the bonding agent in the manner given above, no retardation of setting occurs so that various hardwood species can be used and costs thereby reduced. On a laboratory scale experiments have been carried out to determine the setting time with mixtures of slag and wood flour of various species of wood. Similarly boards have been produced on a laboratory scale from birch, oak, beech, southern pine, eucalyptus and other woods with good results. The results are shown in Table 4.

TABLE 4

Setting times for wood flour/blast-furnace slag mixtures (Vicat).

| Trial no. | w/c ratio | Accelerator as % of slag NaOH | Waterglass | Wood | Wood/ slag + Wood | Setting time (min) Start | Finish |
| --- | --- | --- | --- | --- | --- | --- | --- |
| 1 | 0.36 | 3.6 | 6.9 | — | — | 28 | 70 |
| 2 | 0.60 | 3.0 | 6.9 | spruce | 15% | 15 | 50 |
| 3 | 0.60 | 3.6 | 6.9 | spruce | 15% | 15 | 40 |
| 4 | 0.60 | 3.5 | 7.0 | birch | 10% | 6 | 35 |
| 5 | 0.60 | 3.5 | 7.0 | beech | 10% | 6 | 42 |
| 6 | 0.60 | 3.5 | 7.0 | oak | 10% | 6 | 55 |
| 7 | 0.60 | 3.5 | 7.0 | s. pine | 10% | 6 | 40 |
| 8 | 0.60 | 3.5 | 7.0 | eucalyptus | 10% | 6 | 50 |
| 9 | 0.60 | 3.5 | 7.0 | spruce | 10% | 6 | 35 |
| 10 | 0.60 | 3.5 | 7.0 (x) | spruce | 10% | 10 | 50 |

(x) K waterglass

EXAMPLE 3

Boards of slag with spruce and birch respectively have been manufactured on both a laboratory scale and on full-scale in a factory.

In the laboratory boards were formed from slag and wood by hand in the weight ratio 70:30 and hardened by use of various press times and temperatures. The results are given in Table 5.

TABLE 5

The effect of press time and pressure on the tensile strength in bending of the particle boards. Thickness of boards 10 mm. w/c ratio=0.45.
Spruce particles/slag=30/70.

| Trial no. | Accelerator as % of slag NaOH | Waterglass | Press Time min | Temp °C. | Tensile strength in bending N/mm$^2$ 1 d | 7 d |
| --- | --- | --- | --- | --- | --- | --- |
| 1 | 5 | 10 | 30 | 70 | 3.8 | 4.3 |
| 2 | 5 | 10 | 60 | 70 | 6.2 | 7.4 |
| 3 | 5 | 10 | 30 | 90 | 4.7 | 5.2 |
| 4 | 5 | 10 | 60 | 90 | 8.5 | 8.3 |
| 5 | 5 | 5 | 30 | 110 | 7.5 | 9.4 |
| 6 | 5 | 5 | 60 | 110 | 10.6 | 12.5 |
| 7 | 5 | 10 | 20 | 110 | 10.0 | 12.2 |
| 8 | 5 | 10 | 30 | 110 | 11.8 | 13.0 |
| 9 | 5 | 10 | 20 | 130 | 6.9 | 7.5 |
| 10 | 5 | 10 | 30 | 130 | 8.4 | 9.0 |

The effect of the alkali amounts on the strength of boards of slag and birch flour is shown in Table 6. The press temperature was 125° C. and the press time 20 min. The thickness of the boards was 10 mm.

TABLE 6

Tensile strength in bending of slag/birch boards (70:30) with various additions of NaOH and waterglass.

| Trial no. | NaOH | Waterglass | Density kg/dm$^3$ | Tens. strength in bending 24 h | Notes |
| --- | --- | --- | --- | --- | --- |
| 1 | 3.5% | 3.0% | — | — | Broke in transport |
| 2 | 4.0% | 5.0% | 1433 | 0.99 | Soft |
| 3 | 4.0% | 3.0% | 1392 | 0.46 | Soft |
| 4 | 4.0% | 1.0% | 1404 | 0.69 | Soft |
| 5 | 5.0% | 5.0% | 1477 | 3.2 | |
| 6 | 5.0% | 3.0% | 1535 | 4.0 | |

-continued

| Trial no. | NaOH | Waterglass | Density kg/dm³ | Tens. strength in bending 24 h | Notes |
|---|---|---|---|---|---|
| 7 | 5.0% | 1.0% | 1499 | 3.0 | |

In trials on a laboratory scale only pulverized wood was used which involved a higher water/bonding agent ratio than when using wood in the form of chips. Consequently in laboratory trials lower strength values are to be expected than in full-scale trials.

EXAMPLE 4

Full-scale trials

Trials with finely-ground granulated blast-furnace slag as the bonding agent have been carried out on full scale in a factory where magnesia cement was previously used as the bonding agent.

Slag, spruce chips/birch chips, lye and waterglass together with the required quantity of water were mixed in a forced mixer in batches of 200 kg for 2–3 min. The boards were formed in 3 layers with the mix proportions outer layers—slag/wood—70/30
  core layer—slag/wood—60/40

The quantitative ratio outer layers:core was 50:50.

In the mix for the outer layers the activator used was NaOH and waterglass, respectively 6.2% and 4.6% of the slag quantity. In the core mix the corresponding values were 4.7% and 3.5% respectively.

The moisture content of the spruce chips in the mix for the outer layers was 7% and in that for the core layer 10%. The moisture content of the birch chips was 4.0% and 5.3% respectively.

The water/bonding agent ratio of the mixes varied between 0.30 and 0.34.

The mix was deposited in 3 layers on a conveyor belt of plates, and after preliminary compression was stacked in a holder and finally pressed at 135°–140° C. for 10–15 min.

The boards had a thickness of 12 mm and a density of 1250 kg/m³ was aimed for.

After release the boards were cooled in a cooling duct and were then ready for trimming and sanding. The results are given in Tables 7 and 8.

TABLE 7

Properties of slag/spruce chip boards.

| Batch no. | 1 | 2 | 3 | 4 | 5 | 6 |
|---|---|---|---|---|---|---|
| Press time, min. | 10 | 10 | 10 | 10 | 10 | 10 |
| Press temp. °C. | 140 | 140 | 140 | 140 | 140 | 140 |
| Density kg/m³ | 1268 | 1274 | 1201 | 1239 | 1218 | 1251 |
| Tensile strength in bending N/mm² | 9.8 | 9.6 | 8.6 | 10.0 | 8.8 | 8.5 |
| Tensile strength N/mm² | 0.33 | 0.35 | 0.28 | 0.33 | 0.22 | 0.20 |
| Swelling 2 h in H₂O | 2.5 | 1.9 | 3.5 | 2.8 | 2.5 | 2.9 |

TABLE 8

Properties of slag/birch chip boards.

| Batch no. | 1 | 2 | 3 |
|---|---|---|---|
| Press time, min. | 15 | 10 | 10 |
| Press temp. °C. | 140 | 140 | 135 |
| Density kg/m³ | 1499 | 1287 | 1388 |
| Tensile strength in bending N/mm² | 12.6 | 8.4 | 13.6 |
| Tensile strength N/mm² | 0.53 | 0.30 | 0.25 |
| Swelling 2 h in H₂O | 1.1 | 4.0 | 4.0 |

No optimization of the experimental factors was carried out.

I claim:

1. Fire-resistant wood composite containing a wood component selected from the group consisting of wood chips, wood fiber, sawdust and wood wool, and a bonding agent, characterized in that said bonding agent consists of a finely-ground hydraulic blast-furnace slag which is activated by an activator having an alkaline reaction and water glass.

2. Composite according to claim 1, characterized in that the proportions by weight of the wood component to the blast-furnace slag are between approximately 20:80 and 80:20.

3. Composite according to claim 1, characterized in that part of the blast-furnace slag is replaced by pozzolama.

4. Process for the manufacture of fire-resistant wood composites, in particular wallboards, by bringing a wood component selected from the group consisting of wood chips, wood fiber, sawdust and wood wool, into contact with a bonding agent and an activator and thereafter forming the mixture so obtained to the desired shape under the effect of heat and pressure, characterized in that a finely-ground hydraulic blast-furnace slag is used as a bonding agent, activated by an alkaline salt and a compound having an alkaline reaction.

5. Process according to claim 4, characterized in that the proportions by weight of the wood component to the blast-furnace slag are between approximately 20:80 and 80:20.

6. Process according to claim 4, characterized in that part of the blast-furnace slag is replaced by pozzolana.

7. Process according to claim 4, characterized in that the activator consists of sodium waterglass and sodium hydroxide, which are used in amounts of 0.2–10% sodium waterglass and 1–10% sodium hydroxide calculated on the weight of the blast-furnace slag.

8. The composite according to claim 1 characterized in that the activator having an alkaline reaction is alkali hydroxide.

9. The fire-resistant wood composite of claim 1 comprising wallboard.

10. The fire-resistant wood composite of claim 1 in which said activator comprises sodium water glass and sodium hydroxide in the proportions of approximately 0.2 to 10% sodium water glass and approximately 1 to 10% sodium hydroxide, calculated on the weight of said blast-furnace slag.

11. The composite of claim 1 in which said water glass is sodium water glass.

12. The composite of claim 1 in which said slag has a specific surface area of 470 square meters per kilogram.

13. The process according to claim 4 in which said activator includes water glass and alkali hydroxide in the proportions of approximate 0.2 to 10% sodium water glass and approximately 1.0 to 10% sodium hydroxide calculated on the weight of said blast-furnace slag.

* * * * *